May 27, 1924.

F. C. RUPPEL 1,495,206

PROCESS OF MAKING PLASTIC SEATS

Filed April 6, 1922

INVENTOR.
Frederick C. Ruppel
BY Edward N. Pagelsen,
ATTORNEY.

Patented May 27, 1924.

1,495,206

UNITED STATES PATENT OFFICE.

FREDERICK C. RUPPEL, OF GRAND RAPIDS, MICHIGAN, ASSIGNOR TO HAYES-RUPPEL MANUFACTURING COMPANY, OF GRAND RAPIDS, MICHIGAN, A CORPORATION OF MICHIGAN.

METHOD OF MAKING PLASTIC SEATS.

Application filed April 6, 1922. Serial No. 550,188.

*To all whom it may concern:*

Be it known that I, FREDERICK C. RUPPEL, a citizen of the United States, and residing at Grand Rapids, in the county of Kent and State of Michigan, have invented a new and Improved Method of Making Plastic Seats, of which the following is a specification.

This invention relates to the production of toilet seats from plastic material, and its object is to produce an article of this character which shall be strong and light, which shall be a poor conductor of heat, and which can be produced at low cost.

This invention consists in the process of producing toilet seats which consists in pouring a plastic composition into a flexible trough-shaped mold to partially fill the mold and then, before the plastic composition has become hard, filling the mold with a second plastic composition having greater tensile strength, finishing the exposed surface of the plastic material and then removing it from the mold.

This invention further consists in thoroughly mixing ground cork of various degrees of fineness into a paste of oxy-chloride of zinc or magnesium and a coloring material before pouring it into the mold.

It also consists in the several steps of the process set forth in the annexed claims and in the article produced by said process.

Figure 1:
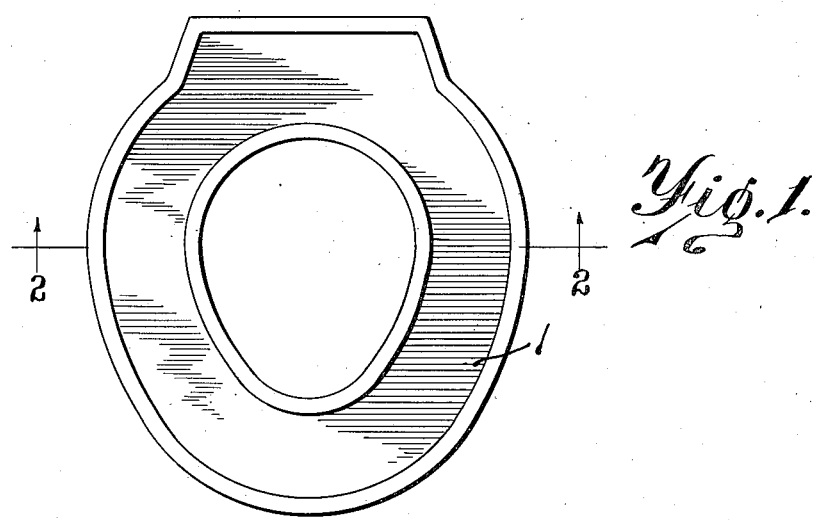
Figure 2:
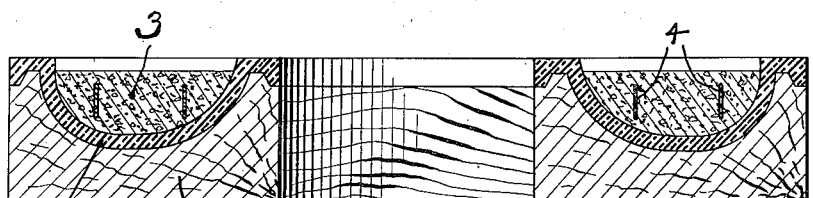
Figure 3:
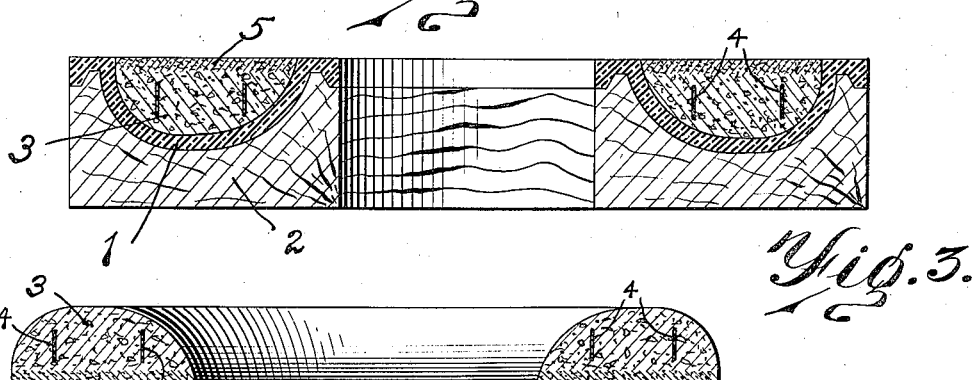
Figure 4:
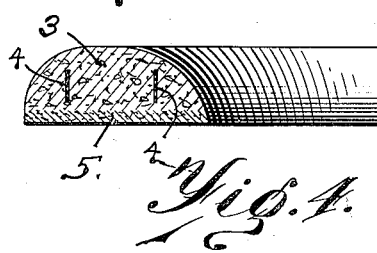

In the accompanying drawing, Fig. 1 is a plan of a flexible mold adapted for the production of my improved toilet seats. Fig. 2 is a section of the mold on the line 2—2 of Fig. 1 when mounted in a support and with the first plastic mass in position. Fig. 3 is a similar section showing the second plastic mass in position. Fig. 4 is a similar section of a finished seat.

Similar reference characters refer to like parts throughout the several views.

The constantly increasing price of wood and its many bad qualities, such as the tendency of glue joints to open, the tendency of the wood to shrink and warp and the tendency to absorb moisture, and the fact that it is a nutrient for bacterial growth, opens the field to the use of a seat of plastic material, which, however, must possess the following characteristics. Its cost of production must be low; it must be at least as strong as wood; it must be practically as poor a conductor of heat as wood; it must be as light as wood so that when permitted to fall on the bowl it will not break the porcelain bowl, and it must not change its shape when exposed to moisture. Further, such a mass should have germicidal properties. A seat having these characteristics may be produced by the process hereinafter described.

A trough-shaped mold 1 of a flexible elastic material is removably mounted in a rigid support 2, the mold being preferably of rubber and the support of wood or metal. Into this mold I pour a plastic mass preferably of the consistency of thin mortar. This mass is prepared by mixing a comminuted natural cellulose such as disintegrated wood or ground cork with a paste of oxy-chloride of zinc or of magnesium. If cork is used, I prefer to use it ground to various sizes from particles which pass through a quarter-inch sieve down to flour, the proportions of the various sizes being such that the finer particles will nearly fill the spaces between the coarser, and the remaining spaces being filled with the paste.

This plastic mass 3 is poured into the mold, reinforcements 4 of any proper character being embedded therein if desired. Fibrous matter such as asbestos or vegetable fibres may be mixed into the mass if desired, but this addition is not usually necessary. As indicated in Fig. 2, this mass 3 does not fill the mold, the remainder of the space being taken up by a second layer 5 of plastic material which is poured on the first before that has set so as to insure a good bond between them. This second mass 5 is preferably made up of a paste of oxychloride together with either vegetable or asbestos fibres or other mechanical binders. If desired, ground cork may be added to this mixture. It is struck off with a straight edge and after it has partially set is finished by troweling.

The plastic masses 3 and 5 may embody finely ground kieselguhr, talc or other inert minerals in order to furnish centers for the crystallization of the oxy-chlorides. The seat after being removed from the mold may be coated with a varnish which carries coloring matter, but as this varnish is liable to wear off in spots, a suitable pigment such as oxide of iron or maganese may be incorporated in the plastic masses before they are poured.

As the rubber mold 1 merely rests in the wood support 2 and can be freely removed therefrom, its removal from the finished seat is an easy matter and there is practically no danger of breaking the seat during such removal. While I have described and illustrated this process in connection with a seat alone, it is evident that flexible molds may be adapted for the production of plastic articles of many different forms.

The details of the various steps of this invention may also be changed by those skilled in the art without departing from the spirit of my invention as set forth in the following claims.

I claim:—

1. The process for producing a plastic body which consists in intimately mixing a batch of ground cork whose particles vary in size from fine dust to those which pass a quarter-inch screen with oxy-chloride of zinc and water, mixing a second batch of oxy-chloride of zinc and water with binding fibres, partly filling an open-top flexible mold with the material of the first batch, filling the remainder of the mold with the material of the second batch, finishing the exposed surface of the plastic mass, and then permitting the plastic mass to harden and removing the mold therefrom.

2. The process of forming a toilet seat of concretionary material consisting in mixing a batch of a paste of a metal oxy-chloride such as that of zinc or magnesium mixed with granulated cellulose such as cork in particles of appreciable variation in size from flour up to that which just passes through a quarter-inch sieve, pouring the paste into an elastic mold, and finishing the exposed surface of the plastic mass.

3. The process of forming a toilet seat of concretionary material consisting in mixing a batch of a paste of a metal oxy-chloride such as that of zinc or magnesium mixed with granulated cellulose such as cork in particles of appreciable variation in size from flour up to that which just passses through a quarter-inch sieve, pouring the paste into an elastic mold until nearly to the top, filling the mold with a plastic mass embodying finely divided cellulose and finely divided fibres, and finishing the exposed surface of the plastic mass.

FREDK. C. RUPPEL.